US 6,395,795 B1

(12) United States Patent
Hrivnak

(10) Patent No.: US 6,395,795 B1
(45) Date of Patent: May 28, 2002

(54) TITANIUM DIOXIDE NUCLEATING AGENT SYSTEMS FOR FOAMABLE POLYMER COMPOSITIONS

(75) Inventor: Jeffrey A. Hrivnak, Glenn Mills, PA (US)

(73) Assignee: Ausimont USA, Inc., Thorofare, NJ (US)

( * ) Notice: Subject to any disclaimer, the term of this patent is extended or adjusted under 35 U.S.C. 154(b) by 0 days.

(21) Appl. No.: 09/964,180

(22) Filed: Sep. 25, 2001

Related U.S. Application Data
(60) Provisional application No. 60/236,991, filed on Sep. 29, 2000.

(51) Int. Cl.$^7$ .................................................. C08J 9/00
(52) U.S. Cl. ........................... 521/85; 521/79; 521/81; 521/89; 521/92; 521/95; 521/145
(58) Field of Search ............................. 521/79, 81, 85, 521/89, 92, 95, 145

(56) References Cited

U.S. PATENT DOCUMENTS

| | | |
|---|---|---|
| 2,962,456 A | 11/1960 | Carlson, Jr. |
| 3,072,583 A | 1/1963 | Randa |
| 3,554,932 A | 1/1971 | Overcashier |
| 3,558,532 A | 1/1971 | Sundquist et al. |
| 3,677,980 A | 7/1972 | Last |
| 3,702,267 A | 11/1972 | Grot |
| 3,725,317 A | 4/1973 | Ronden et al. |
| 3,929,686 A | 12/1975 | Stevenson |
| 3,959,192 A | 5/1976 | Delfosse et al. |
| 3,959,197 A | 5/1976 | Sayler et al. |
| 3,962,154 A | 6/1976 | Egli |
| 3,993,609 A | 11/1976 | Kamens et al. |
| 4,016,111 A | 4/1977 | Wolff et al. |
| 4,016,115 A | 4/1977 | Miyake et al. |
| 4,048,272 A | 9/1977 | Spicuzza, Jr. |
| 4,054,550 A | 10/1977 | Parker et al. |
| 4,069,291 A | 1/1978 | Kidoh et al. |
| 4,086,191 A | 4/1978 | Hinselmann et al. |
| 4,171,428 A | 10/1979 | Kuhn |
| 4,183,822 A | 1/1980 | Collington et al. |
| 4,304,713 A | 12/1981 | Perelman |
| 4,328,319 A | 5/1982 | Osipow et al. |
| 4,331,619 A | 5/1982 | Chung et al. |
| 4,394,458 A | 7/1983 | Wade |
| 4,394,460 A | 7/1983 | Chung et al. |
| 4,397,948 A | 8/1983 | Wade |
| 4,399,237 A | 8/1983 | Morrison, Jr. |
| 4,413,065 A | 11/1983 | Hall et al. |
| 4,511,678 A | 4/1985 | Mahnke et al. |
| 4,572,740 A | 2/1986 | Kretzschmann et al. |
| 4,587,272 A | 5/1986 | Avakian et al. |
| 4,594,368 A | 6/1986 | Sayler et al. |
| 4,613,524 A | 9/1986 | Walles |
| 4,615,850 A | 10/1986 | Pecsok |
| 4,647,498 A | 3/1987 | Walles |
| 4,647,594 A | 3/1987 | De Munck et al. |
| 4,675,345 A | 6/1987 | Pecsok |
| 4,683,247 A | 7/1987 | Allen et al. |
| 4,692,381 A | 9/1987 | Pecsok |
| 4,704,239 A | 11/1987 | Yoshimura et al. |
| 4,764,538 A | 8/1988 | Buckmaster et al. |
| 4,801,484 A | 1/1989 | Yao et al. |
| 4,877,815 A | 10/1989 | Buckmaster et al. |
| 4,879,138 A | 11/1989 | Johnson et al. |
| 5,023,279 A | 6/1991 | Buckmaster et al. |
| 5,032,621 A | 7/1991 | Buckmaster et al. |
| 5,149,721 A | 9/1992 | Ishikawa et al. |
| 5,180,751 A | 1/1993 | Park et al. |
| 5,180,754 A | 1/1993 | Morita et al. |
| 5,225,107 A | 7/1993 | Kretzschmann et al. |
| 5,227,408 A | 7/1993 | Hanna et al. |
| 5,250,579 A | 10/1993 | Smits et al. |
| 5,266,606 A | 11/1993 | Gilch et al. |
| 5,281,632 A | 1/1994 | Smits et al. |
| 5,314,925 A | 5/1994 | Burnell et al. |
| 5,336,694 A | 8/1994 | Lauri |
| 5,358,675 A | 10/1994 | Campbell et al. |
| 5,387,617 A | 2/1995 | Hedstrand et al. |
| 5,468,782 A | 11/1995 | Mehan |
| 5,472,990 A | 12/1995 | Craig et al. |
| 5,500,450 A | 3/1996 | Simandl et al. |
| 5,574,074 A | 11/1996 | Zushi et al. |
| 5,599,851 A | 2/1997 | Jin et al. |
| 5,610,203 A | 3/1997 | Buckmaster et al. |
| 5,641,549 A | 6/1997 | Johnston et al. |
| 5,696,176 A | 12/1997 | Khemani et al. |
| 5,710,186 A | 1/1998 | Chaudhary |
| 5,712,318 A | 1/1998 | Buckmaster et al. |
| 5,716,665 A | 2/1998 | Vita et al. |
| 5,716,998 A | 2/1998 | Munakata et al. |
| 5,726,214 A | 3/1998 | Buckmaster et al. |
| 5,830,923 A | 11/1998 | Venkataraman |
| 5,837,173 A | 11/1998 | Vita et al. |

Primary Examiner—Morton Foelak
(74) Attorney, Agent, or Firm—Norris, McLaughlin & Marcus

(57) ABSTRACT

The invention concerns nucleating agent systems for foamable polymer compositions, preferably fluoropolymer resins, having foam cell nucleation sites using titanium dioxide based nucleating agents, and foamable polymers comprising the nucleating agents. The nucleating agent systems comprise $TiO_2$, certain inorganic salts, and, optionally, sulphonic acid and/or phosphonic salts. The invention also concerns foamable composition concentrates and foamed thermoplastic insulation material comprising fluoropolymer agent systems.

14 Claims, No Drawings

TITANIUM DIOXIDE NUCLEATING AGENT SYSTEMS FOR FOAMABLE POLYMER COMPOSITIONS

CROSS REFERENCE TO RELATED APPLICATIONS

This Application claims the benefit of U.S. Provisional Application No. 60/236,991 filed Sep. 29, 2000.

BACKGROUND OF THE INVENTION

1. Field of the Invention

The invention relates nucleating agent systems for foamable polymer compositions, preferably fluoropolymer resins, having foam cell nucleation sites using titanium dioxide ("$TiO_2$") based nucleating agents. The nucleating agent systems comprise synergistic amounts $TiO_2$, certain inorganic salts, and optionally, sulfonic acid salts and/or phosphonic acid salts. The fluoropolymers useful for making the foamable compositions described herein are organic polymeric materials comprising at least about 35 weight percent fluorine and having a melt flow rate ("MFR") of about 1 g/10 min. to about 100 g/10 min. as measured according to ASTM Standard D1238. The nucleating agents comprise $TiO_2$ in amounts from about 50 parts per million ("ppm") to about 2,000 ppm by weight based on the total weight of the composition, inorganic salt in amounts from about 25 ppm to about 3,000 ppm by weight based on the total weight of the composition and, optionally, sulfonic acid salts and/or phosphonic acid salts in amounts of from 0 to about 3,000 ppm by weight based on the total weight of the composition. The foamed fluoropolymer compositions comprising the nucleating agents addressed herein have good structure and cell size, smaller than can be achieved with other systems, and have exemplary performance characteristics particularly for thin walled foamed insulation for conductive materials.

2. The Related Art

Foamed polymer compositions generally comprise nucleating agents to form a cell structure during processing. Conventional nucleating agents are boron nitride ("BN"), calcium carbonate, magnesium dioxide, lead oxide, barium oxide, antimony oxide, magnesium carbonate, zinc carbonate, barium carbonate, carbon black, graphite, alumina, calcium silicate, calcium metasilicate and calcium sulfate. Polytetrafluoroethylene ("PTFE") is described in U.S. Pat. No. 4,304,713 as a nucleating agent for making dielectric compositions for use in coaxial cables, and U.S. Pat. No. 5,314,925 discusses fluoropolyolefin nucleating agents for molded thermoplastics. U.S. Pat. No. 5,716,665 addresses the use of PTFE, as well as BN, silicon nitride, alumina, talc and zinc sulfide, as nucleating agents for foamable solid compositions based on thermoprocessible perfluoropolymers.

Despite the number of nucleating agents disclosed in the art, BN has traditionally been the most preferred, particularly for making foamed insulation for conductive wire or other materials. BN, however, must generally be used in amounts from 0.5% to 2.0% by weight of total composition (5,000 ppm to 20,000 ppm) for effective nucleation of fluoropolymers. BN is a rather expensive, ranging in price from about $60 per pound to about $90 per pound. The price of BN is a significant drawback to the use of BN in all applications, and, accordingly, the art of nucleating agents for foamed polymer compositions is evolving to obtain nucleating agent systems which eliminate or reduce the quantity of BN while maintaining or improving on the performance characteristics needed for many applications.

Conductive wire is often used to transmit electronic signals. The conductor or conductive material must be protected, or insulated, and thermoplastic coatings in a molten state foamed and formed onto and around the conductor or conductive material are used for this purpose. The thermoplastic materials are selected on the basis of several criteria including high dielectric strength, low dielectric constant, and low dissipation factor. It has previously been found that if the thermoplastic material is foamed as it is applied to wire, the dielectric constant is desirably reduced due to the formation of numerous small non-interconnected cells in the foam. U.S. Pat. No. 3,072,583 discloses a nucleated foaming process for extruding perfluorinated polymer foam around transmission wire with a gas blowing agent. Foamed insulation using other thermoplastic materials, especially polyolefins, is also known in the art.

In general, after a conductor or conductive material is insulated with a foamed polymer, it is twisted into pairs (twinning), then four pairs are typically twisted together, and a polymer jacket is added to make the final cable. Adequate crush force of the insulation material is necessary so that the insulation material will maintain its structural integrity, e.g. foamed cell structure, during twinning and consumer use. Structural integrity can be achieved by minimizing or eliminating the amount of elongated cells in the foamed polymer structure and maximizing the amount of smaller sized cells. Elongated cells are elliptically shaped and are merely voids filled with gas, such as nitrogen, and provide poor mechanical strength to the foamed polymer. As such, during twinning, insulation material with a significant number of elongated cells has a tendency to crush which results in a final cable with poor electrical properties. Nucleating agents must be selected to obtain spherical shaped cells which provide the mechanical strength for durability, particularly during twinning operations, to obtain a final cable with good mechanical strength and good electrical properties. Thus, foamed polymer compositions require effective nucleating agent systems in effective amounts to make a foamed polymer with the appropriate structural integrity and performance properties, particularly for use as insulation for conductive materials.

In general, reduction in foam cell size is desired for thermoplastic resins. In particular, for thin wall foams (e.g. 5–10 mils) small voids to maximize the number of bubbles are desired for mechanical and electrical properties. This is especially so for smaller wire constructions of interest in the electronics field, so that, for example, foam cell dimensions will be small with respect to the radial dimension of the thin insulation.

Void space of foamed polymers is also important with regard to the capacitance of the foamed insulation material. It is important that the conductor with foamed insulation (primary) have a capacitance with low standard deviation. If the voids in the foamed insulation are not uniform, then capacitance variation can arise along a coated wire. Accordingly, small uniform bubbled distribution within the insulation material, which arises by creation of spherical shaped cells, will result in uniform capacitance. Thus, the nucleating agents are selected to obtain the uniform cell distribution within the foamed insulation material for stable capacitance.

Foamed fluoropolymers are also useful in applications other than wire insulation. Examples of foam structures include foamed sheet for electrical insulation, thermal insulation and cushioning, foamed pipe and tubing and injection molded pieces. Structural integrity and the minimization or elimination of elongated cells are also important for these applications.

A 0.5 to 2.0 weight percent loading of BN alone (5,000 ppm to 20,000 ppm) is typically used to provide foam cell nucleation in fluoropolymer resins having uniform, small cell structure. U.S. Pat. No. 4,764,538 discusses the use of synergistic combinations of BN in amounts of 0.02 to 2.0% by weight, and certain inorganic salts in amounts of 25 ppm to 3,000 ppm. The preferred range for BN in this system is 500 ppm to 10,000 ppm, and the minimum BN concentration exemplified in the patent is 2,500 ppm.

U.S. Pat. No. 4,877,815 describes a class of sulfonic and phosphonic acids, and salts of the acids, which are said to be effective nucleating agents for a wide variety of thermoplastic materials. The patent discusses the combination of certain sulfonic and phosphonic acids with BN, alone or combined with calcium tetraborate for foaming tetrafluoroethylene/hexafluoropropylene copolymers. U.S. Pat. No. 5,610,203 concerns the combination of BN crystals grown to final size, inorganic salt and/or sulfonic or phosphonic acids as nucleating agents.

$TiO_2$ is a white inorganic material and has a current market price of about \$1 to about \$2 per pound. $TiO_2$ is described in the art as a nucleating agent for foamed polymers, however, through the invention described herein it is discovered that $TiO_2$ used in certain quantities in conjunction with certain inorganic salts and, optionally, sulfonic acid salts and/or phosphonic acid salts act synergistically to result in foamed fluoropolymer compositions with good cell structure and size than can be achieved with known systems, including conventional nucleating systems comprising $TiO_2$. $TiO_2$ is also known to have use as a pigment and in topical medicinal preparations.

U.S. Pat. No. 4,615,850 discusses foamable polyvinylidene fluoride polymers using a nucleating agent having an average particle size of less than 2 microns. A myriad of nucleating agents are referenced in the patent, including $TiO_2$, however the patent provides no disclosure of $TiO_2$ used in conjunction with inorganic salts, sulfonic acid salts or phosphonic acid salts, and only foamed polymer compositions comprising calcium carbonate nucleating agents are exemplified. U.S. Pat. No. 5,696,176 addresses foamable polyester compositions comprising a nucleating agent of a polyolefin and inorganic materials, such as $TiO_2$, talc, chopped fiberglass, alumina, clay and fumed silica. U.S. Pat. No. 5,710,186 discusses closed cell polymer foam comprising $TiO_2$, surface treated with either organic materials or organic and inorganic materials which particulate is used to prevent or reduce agglomeration and reduce thermal conductivity. Nucleating agents in coating compositions comprising glass microballoons and pigments such as $TiO_2$ and ZnO are discussed in U.S. Pat. No. 4,594,368.

An object of the invention is nucleating agents, and nucleating agent systems, which enhance the effective nucleation of polymers, particularly fluoropolymers, and provide exemplary cell structure, which do not comprise BN and, thus, have lesser cost than nucleating agent systems comprising BN while having enhanced nucleating effectiveness.

It is a further object of the invention to obtain foamed polymer compositions comprising these nucleating agents for use in conductive wire jacketing and insulation, or otherwise.

These and other objectives are achieved by the nucleating agents described herein comprising a synergistic combination of $TiO_2$, inorganic salts and, optionally, sulfonic acid salts and/or phosphonic acid salts. It was unexpectedly discovered that $TiO_2$ in the $TiO_2$ based nucleating agent systems described herein could be used in concentrations significantly less than the BN concentrations in conventional systems, and that nucleating agent systems comprising $TiO_2$, certain inorganic salts and, optionally, sulfonic acid salts and/or phosphonic acid salts had better efficiency and provided smaller cell size at very low concentrations than nucleating systems in the art. Thus, a substantial cost saving can be achieved with the nucleating agent systems described herein comprising $TiO_2$ and the foamed polymers comprising these nucleating agent systems.

In the present Specification, all parts and percentages are by weight/weight unless otherwise specified.

SUMMARY OF THE INVENTION

The invention pertains to nucleating agent systems comprising synergistic amounts of $TiO_2$, certain inorganic salts and, optionally, sulfonic acid salts and/or phosphonic acid salts. The composition of the nucleating agent system will depend on the specific thermoplastic resin, combination of components and the desired foam structure. Typically, however, the nucleating agents comprise $TiO_2$ in amounts from about 50 ppm to about 2,000 ppm, preferably about 100 ppm to about 1,500 ppm, by weight based on the total weight of the composition, inorganic salt in amounts from about 25 ppm to about 3,000ppm, preferably about 25 ppm to about 1,000 ppm, most preferably about 50 ppm to about 500 ppm, by weight based on the total weight of the composition and, optionally, sulfonic acid salt and/or phosphonic acid salt, or combinations thereof, in amounts of from 0 to about 3,000 ppm, preferably about 100 ppm to about 3,000 ppm, most preferably about 200 ppm to about 1,500 ppm, by weight based on the total weight of the composition.

A wide variety of inorganic salts can be used. Sodium tetraborate ($Na_2B_4O_7$) and calcium tetraborate ($CaB_4O_7$), however, are preferred. The sulfonic acid salts that are preferred in this invention are those salts of $CF_3CF_2(CF_2CF_2)_nCH_2CH_2SO_3X$ where X is either H or $NH_4$ and n=1–10, predominantly n=2–4, preferably the barium salt. A useful sulfonic acid salt for the invention is ZONYL® BAS, which is barium salt of ZONYL TBS, both available from E.I. DuPont de Nemours and Company ("DuPont"), Wilmington, Del., USA. Other sulfonic acid salts that can be used are potassium perfluorooctane sulfonate sold under the trademark FLUORAD® FC-95, potassium perfluorobutane sulfonate (L-7038) both available from 3M, St. Paul, Minn., USA and perfluoroalkyl sulphonic acid available under the tradename FORAFAC® 01176 from Atofina Chemicals, Philadelphia, Pa., USA.

The preferred thermoplastic resins useful for the invention are polymers having at least about 35 weight percent fluorine and having a melt flow rate (measured in g/10 minutes) of about 1 to about 100, preferably about 5 to about 35. Preferred polymers include polyvinylidene fluoride; copolymers of tetrafluoroethylene ("TFE") and perfluoro(methyl vinyl ether) ("PMVE"); copolymers of TFE, PMVE and perfluoro(propyl vinyl ether) ("PPVE"); ethylene/chlorotrifluoroethylene ("E/CTFE"); copolymers of E/CTFE and butyl acrylate and/or hexafluoroisobutylene ("HFIB") and copolymers of TFE and hexafluoropropylene ("HFP") optionally containing one or more additional monomers, including perfluoro (alkyl vinyl ether) ("PAVE").

Thermoplastic resin, $TiO_2$, inorganic salt, and, optionally, the sulfonic acid salt and/or phosphonic acid salt can be combined in several ways to achieve foamable compositions, or concentrates that can be diluted to foamable compositions. By way of non-limiting examples, thermoplastic resin in powder or cube form, $TiO_2$, inorganic salt, and sulfonic acid salt and/or phosphonic acid salt if desired, can be dry blended in desired proportions and melt extruded to obtain a compounded composition. Alternatively, individual concentrates of the $TiO_2$, inorganic salt, and, optionally, sulfonic acid salt and/or phosphonic acid salt in thermoplastic resins can be blended with the same or a different compatible thermoplastic resin and then extruded to the desired composition. Alternatively, one or more of the nucleating agent components in powder form can be combined with concentrates of one or more of the nucleating agent components, and the thermoplastic resin. Alternatively, one component of the nucleating agent system can first be incorporated into the thermoplastic resin by extrusion, and then the second component of the nucleating agent system can be added.

The foamable thermoplastic resin compositions comprising the $TiO_2$ nucleating agent systems described herein have a variety of uses, including insulating materials for conductors or conductive material, thermal insulation, cushioning, foamed pipe and tubing and molded articles, (e.g. injection molded articles). In particular, the nucleating agents can be combined with thermoplastic resin and processed to obtain foamed insulation material for conductors or conductive material, the insulation material having a wall thickness of about 0.005 to about 0.300 inches, preferably about 0.025 to about 0.200 inches when the nucleating agent system does not comprise sulfonic acid salt and/or phosphonic acid salt, and about 0.005 inches to about 0.025 inches when sulfonic acid salt and/or phosphonic acid salt is included.

DETAILED DESCRIPTION OF THE INVENTION

The nucleating agent systems of the invention comprise $TiO_2$, certain inorganic salts and, optionally, sulfonic acid salts and/or phosphonic acid salts. The nucleating agents are, generally, used in conjunction with a thermoplastic polymer to make foamed polymer articles, such as foamed insulation for conductors or conductive materials. The components of the nucleating agent systems function synergistically to provide for foamed polymer compositions with smaller cell size and better structure compared to nucleating agents known in the art, such as those comprising BN. It is discovered that $TiO_2$ can be used in the nucleating agent system at a range of about 50 ppm to about 2,000 ppm to obtain foamed polymer articles having enhanced and acceptable performance characteristics. Thus, the invention allows the use of $TiO_2$ in smaller amounts compared to BN, such as grades SHP-325 or CTF-5 available from Carborundum Boron Nitride, Amherst, N.Y., USA, which when used alone requires loading requirements in the range of about 5,000 ppm to about 20,000 ppm, and provide foamed polymer articles with smaller cell size than can be achieved with nucleating systems known in the art.

$TiO_2$ is a white inorganic powder that is found in nature, and can be prepared by methods such as the direct combination of titanium and oxygen, treatment of titanium salts or by chemical reaction or hydrolysis. Useful forms of $TiO_2$ for the nucleating agent systems of the invention are available from DuPont under the trademark TI-PURE® Grades R-900, R-902, R-960, and R-931. $TiO_2$ products available from Ishihara Corporation, San Francisco, Calif., USA under the trademark TIPAQUE® and $TiO_2$ products under the trade names KIMERIA $TiO_2$ and/or TRONOX available from Kerr-McGee Chemical LLC, Oklahoma City, Okla., USA are also useful for the invention. The $TiO_2$ products may have a $TiO_2$ content of about 70% to 100%, with the balance of the product being alumina, silica, organic materials, as surface coatings, additives, fillers and/or pigments. $TiO_2$ having inorganic surface coating such as alumina or a combination of alumina and silica are preferred for the invention.

The nucleating agent systems comprise $TiO_2$ as a component of a nucleating agent for thermoplastic polymers in combination with certain inorganic salts and, optionally, sulfonic acid salts and/or phosphonic acid salts. The nucleating agents comprise $TiO_2$ in amounts from about 50 ppm to about 2,000 ppm, preferably about 100 ppm to about 1,500 ppm, by weight based on the total weight of the composition, inorganic salt in amounts from about 25 ppm to about 3,000 ppm, preferably about 25 ppm to about 1,000 ppm, most preferably about 50 ppm to about 500 ppm, by weight based on the total weight of the composition and, optionally, sulfonic acid salts and/or phosphonic acid salts, or combinations thereof, in amounts of from 0 to about 3,000 ppm by weight based on the total weight of the composition. When the composition comprises sulfonic acid salts and/or phosphonic acid salts, however, the preferred amount of such salts is about 100 ppm to about 3,000 ppm, most preferably about 200 ppm to about 1,500 ppm, by weight based on the total weight of the composition. The term "by weight based on the total weight of the composition" means the weight of the components of the nucleating agent system plus the weight of the thermoplastic polymer and any additives, fillers, pigments or other matter in the composition.

Inorganic salts useful for the invention include, those selected from the group consisting of lithium carbonate, calcium carbonate, calcium tetraborate, strontium carbonate, sodium carbonate, sodium tetraborate, sodium sulfite, potassium tetraborate, potassium pyrosulfate, potassium sulfate, barium nitrate, aluminum phosphate, sodium fluorosilicate and combinations thereof. The inorganic salts that are preferred for use in the invention are sodium tetraborate and calcium tetraborate.

The sulfonic acid salts that can be used in the invention are metal salts or other salts, such as hydrogen, ammonium, substituted ammonium and quaternary ammonium, of $CF_3CF_2(CF_2CF_2)_nCH_2CH_2SO_3X$ where X is either H or $NH_4$ and n=1–10, predominantly n=2–4. Barium salts of sulfonic acid, such as ZONYL BAS from DuPont, are the preferred sulfonic acid salts, however, other metal salts that can be used in the invention are zirconium, cerium, aluminum, chromium, iron, zinc, calcium, strontium, potassium, or lithium. Other sulfonic acid salts that can be used are potassium perfluorooctane sulfonate, such as FLUORAD FC-95, and potassium perfluorobutane sulfonate (L-7038), both available from 3M, and FORAFAC 1176 available from Atofina Chemicals.

Phosphonic acid salts can be used in the $TiO_2$ nucleating agent systems, in addition to or in place of the sulfonic acid salts. Barium salts of phosphonic acid, such as barium salt of Ashahi Guard AG-530N available from Asahi Glass Co., Ltd., Tokyo, Japan are the preferred phosphonic acid salts used in the nucleating agent system, however, phosphonic acid salts of zirconium, cerium, aluminum, chromium, iron, zinc, calcium, strontium, potassium or lithium can also be used.

Commercially available barium acid salts, such as ZONYL BAS available from DuPont, can be used in the $TiO_2$ nucleating agent systems. The barium acid salts of sulfonic acid can also be made using raw material anhydrous BaCl$_2$ and water borne sulfonic acid, such as ZONYL TBS available from DuPont, and FORAFAC® 1033 D and 1187 available from Atofina Chemicals, according to the following bench formula and process which, as will be understood by one skilled in the art, can be scaled-up to make larger batch sizes. For clarity, the process is described with respect to ZONYL TBS, however, other raw materials can be readily used in the process. A reaction mass is formed using ZONYL TBS and anhydrous BaCl$_2$. The ZONYL TBS solution having approximately 30% solids is heated to approximately 70° C. to achieve a uniform mixture. Then, 50.0 grams of the uniform mixture of ZONYL TBS is diluted with 200 grams of de-ionized water in 1 liter flask. After the dilution, 6.63 grams of anhydrous BaCl$_2$ dissolved in approximately 20 grams of de-ionized water is added under constant agitation. After 30 minutes, the reaction mass is poured onto a coarse filter paper (P-8) attached to a Boechner funnel to obtain solids which are then washed in a screw top jar by adding 400 milliliters of de-ionized water and shaking vigorously. The solids are then recovered on filter paper and the washing procedure is repeated twice more. The solids are then dried for 3 days at 250° C. and then passed through a 500 micron Sieve. Subsequently, the dried solids are ground in a 4 inch horizontal air mill to obtain the barium salt of sulfonic acid of the desired size.

The thermoplastic resins useful in the invention include all such resins that can be foamed by a gas injection process and/or by use of a chemical blowing agent. Preferred resins, include fluoropolymers and polyolefins. Foamed fluoropolymers are generally foamed by continuous gas injection using nitrogen, carbon dioxide, argon, helium or other gas or gas mixture which is either soluble in or disperses in the molten resin, using an extruder screw designed for foam operations, and a nucleating agent. Nitrogen is especially suited for foaming the fluoropolymers with the TiO$_2$ nucleating agents because the nitrogen easily dissolves and/or disperses in molten fluoropolymer resins, and its thermal stability is adequate to survive the holdup time in the extruder when mixed with molten resin at temperatures up to about 450° C.

A nucleating agent is needed to achieve uniform small-diameter cell structure. According to the invention, the nucleating agent system for fluoropolymer resins comprising TiO$_2$, inorganic salts and, optionally, sulfonic acid salts, and/or phosphonic acid salts provide a foamed polymer having smaller cell size than foamed polymers comprising nucleating agents having BN, including systems where BN is combined with inorganic salts and/or sulfonic acid salts.

The gas dissolves and/or is dispersed in the molten thermoplastic resin inside the extruder. By adjusting the gas pressure in the feed, the amount of gas dissolved or dispersed in the melt can be controlled. As an alternative process, a chemical blowing agent (a chemical which is unstable at the polymer processing temperature and liberates a gas, such as nitrogen, carbon dioxide or hydrogen) can be incorporated into the thermoplastic to provide the gas which causes bubble formation.

Foam cell formation actually starts shortly after the molten resin containing the blowing agent passes out of the extrusion die. The gas dissolved or dispersed in the molten resin expands because of the sudden drop in melt pressure as the extrudate exits the extrusion die. The polymer is solidified when the extrudate is cooled, such as being treated with water thereby stopping foam cell growth.

The polymer resins useful in the present invention are organic polymeric compounds, preferably fluoropolymers comprising at least about 35 weight percent fluorine, having a melt flow rate of about 1 g/10 min. to about 100 g/10 min. preferably about 5 g/10 min. to about 35 g/10 min. as measured according to ASTM D1238 at the temperature appropriate to each resin.

Polymers useful for the invention include:
1. Homopolymers of chlorotrifluoroethylene (CTFE), 2,2-difluoroethylene, or vinylidene fluoride.
2. Copolymers of TFE and a monomer selected from the group consisting of CTFE, 2,2-difluoroethylene or vinylidene fluoride.
3. Copolymers of at least one monomer selected from the group consisting of TFE, CTFE, 2–2-difluoroethylene, vinylidene fluoride, and combinations thereof, and one or more monomers selected from the group consisting of hexafluoropropylene ("HFP"), ethylene ("E"), terminally unsaturated perfluoroolefins having 3–8 carbon atoms, PAVE having 3–8 carbon atoms, perfluoro (alkoxy alkyl vinyl ether) having 5–12 carbon atoms, perfluoroalkyl ethylene having 3–8 carbon atoms, and monomers of the dioxle family, such as perfluorodioxole, perfluoro (2,2 dimethyl-1,3-dioxole), and perfluoro (5 methoxy-1,3-dioxole), and combinations thereof.

Preferred fluoropolymers include the copolymers of TFE and PMVE; copolymers of TFE, PMVE and PPVE; copolymers of TFE and PPVE;-copolymers of TFE and perfluoro (ethyl vinyl ether); E/CTFE; copolymers of E/CTFE and butyl acrylate and/or HFIB; polyvinylidene fluoride and copolymers of TFE and HFP optionally containing one or more additional monomers, including PAVE.

Thermoplastic resin, inorganic salt, and, optionally, the sulfonic acid salt and/or phosphonic acid salt can be combined in several ways to achieve foamable compositions, or concentrates that can be diluted to foamable compositions. By way of example and not limitation, thermoplastic resin in powder or cube form, TiO$_2$, inorganic salt, and sulfonic acid salt and/or phosphonic acid salt, if desired, can be dry blended in desired proportions and melt extruded to obtain a compounded composition. Alternatively, individual concentrates of the same or TiO$_2$, inorganic salt, or optionally, sulfonic acid salt and/or phosphonic acid salt in thermoplastic resins can be blended with compatible thermoplastic resin and then extruded to the desired composition if the different thermoplastic resins are compatible. Alternatively, one or more of the nucleating agent components in powder form can be combined with concentrates of one or more of the nucleating agent components, and the thermoplastic resin. Alternatively, one component of the nucleating agent system can first be incorporated into the thermoplastic resin by extrusion, and then the second component of the nucleating agent system can be added. Other processing methods know in the art may also be utilized to advantage.

The concentrations of TiO$_2$, inorganic salt, and, optionally, sulfonic acid salt and/or phosphonic acid salt to produce an effective foam cell nucleation system, that is a system that provides for a uniform, small spherical cell structure without any or a significant number of elongated cells, will depend on the foam structure being produced, the specific resin being used, and the combination of nucleating agent components. For the foamable thermoplastic resin compositions discussed herein, TiO$_2$ has concentration in the range of about 50 ppm to about 2,000 ppm by weight, based on the total weight of the composition, preferably about 100 ppm to about 1,500 ppm. The concentration of inorganic salt is in the range of about 25 ppm to about 1,000 ppm by weight, based on the total weight of the composition, preferably about 50 ppm to about 500 ppm. Polymers having a very high dielectric constant may require even higher level of inorganic salt, e.g. up to about 3,000 ppm based on the total weight of the composition. The concentration of the sulfonic acid salt and/or phosphonic acid salt is generally 0 to about 3,000 ppm, preferably about 100 ppm to about 3,000 ppm, most preferably about 200 ppm to about 1,500 ppm, based on the total weight of the composition. More than one type of inorganic salt, sulfonic acid salt and/or phosphonic acid salt can be used, with combined concentrations as recited above, but generally a single type in each category selected for the particular foam nucleating agent system is used. Polymers of the type preferred for the invention generally require from about 5,000 ppm to about 10,000 ppm BN loadings, when used alone in conventional BN nucleating agent systems, for effective nucleation.

When a foamable composition concentrate is prepared, the concentrations of the components of the foam nucleating agent system are usually some multiple of the concentrations recited above. It is convenient to make concentrates with concentration of nucleating agent 10× to 20× the concentration desired for the foamable extrusion composition, in which case one part of the concentrate is blended with 9 parts to 19 part of natural resin, i.e., resin containing no nucleating agent, respectively. The foamable composition concentrate will comprise any of the organic polymers or fluoropolymers discussed herein and from about 500 ppm to about 40,000 ppm, preferably about 1,000 ppm to about 30,000 ppm titanium dioxide; about 250 ppm to about 60,000 ppm, preferably about 250 ppm to about 20,000 ppm, most preferably about 500 ppm to about 10,000 ppm, of the inorganic salts discussed herein and 0 to about 60,000 ppm, preferably about 1,000 ppm to about 60,000 ppm, most preferably about 2,000 ppm to about 30,000 ppm, sulfonic acid salts, phosphonic acid salts and combinations thereof as discussed herein all by weight, based on the total weight of the concentrate, i.e. prior to dilution. While the natural resin should at least be compatible with the resin used in the concentrate, it need not have the same chemical composition or be of the same grade. However, it is common to use natural resin of the same grade used as the matrix for the concentrate.

The foamable thermoplastic resin compositions of this invention are useful for making foam structures, especially foamed insulation for conductors or conductive material, the insulation having a wall thickness of about 0.005 inches to about 0.300 inches. The most preferable wall thickness for $TiO_2$/inorganic salt system is about 0.025 inches to about 0.200 inches and the most preferable wall thickness for $TiO_2$/inorganic salt/sulfonic acid salt and/or phosphonic acid salt system is about 0.005 inches to about 0.025 inches.

The invention involves a nucleating agent system comprising $TiO_2$, inorganic salts, preferably sodium tetraborate or calcium tetraborate, and optionally sulfonic acid salts, preferably barium salts of sulfonic acid, and/or phosphonic acid salts, preferably barium salts of phosphonic acid. The inventor has discovered that $TiO_2$, which is a relatively inexpensive material, can be used in effective amounts in conjunction with the inorganic salts and, optionally, sulfonic acid salts and/or phosphonic acid salts at much lower concentrations than BN, to achieve foamed polymer compositions having better cell structure and performance properties. A critical range of $TiO_2$ of between about 50 ppm to about 2,000 ppm, preferably about 100 ppm to about 1,500 ppm, by weight based on the total weight of the composition, used in conjunction with the inorganic salt and, optionally, sulfonic acid salt and/or phosphonic acid salt is identified that results in foamed polymer articles, particularly insulation for conductors and conductive materials, including thin walled applications. Foam cell size is important to the performance properties of the polymer, and the cells should not be elongated. The foamed products made with the $TiO_2$ nucleating agent system have unexpectedly better cell size and structure than foamed polymers made with other agents, including BN. $TiO_2$ used in conjunction with inorganic salts and, optionally, sulfonic acid salts and/or phosphonic acid salts at the low concentrations, provides for better nucleating, e.g. smaller cell size, than with a corresponding amount of BN and the same salts. Also, substantial cost savings can be achieved in that 1)BN, which costs about $60 to about $90 per pound compared to $1 to $2 per pound for $TiO_2$, can be completely eliminated from the foaming process and 2) less amount of $TiO_2$ is needed than BN for more effective nucleation.

EXAMPLES

The foamable fluoropolymer compositions used in the examples were formulated by developing a fluoropolymer blend concentrate comprising the nucleating agent system, and then diluting the concentrate with a natural resin. The foamable fluoropolymer resin concentrates used in the following examples were prepared by combining MFA 6012 resin powder, available from the assignee of invention, Ausimont USA, Inc., Thorofare, N.J., USA under the trademark HYFLON® MFA6012, with additives comprising the nucleating agent system, specifically $TiO_2$, an inorganic salt of either sodium tetraborate or calcium tetraborate and, optionally, a barium salt of sulfonic acid or other sulfonic acid salts, as identified in Table 1. The barium salt of sulfonic acid was prepared from water borne ZONYL TBS Fluorosurfactant and $BaCl_2$ using the bench process described herein. Certain comparative preparations were formulated as noted.

The components of the resin concentrate are combined in a polyethylene bag, blended well by shaking and kneaded by hand, and then extruded through a Model CTSE-V extruder, available from C.W. Brabender, South Hackensack, N.J., USA, equipped with co-rotating conical twin compounding mixing screws and a strand cutter to pelletize to form concentrate pellets. The concentrate pellets were then blended with pellets of natural fluoropolymer resin and the pellet blend was fed to a standard commercially available wire coating extruder hopper.

The concentration of additives (e.g. the components of the nucleating agent systems) in the examples are calculated and expressed by weight based on the total weight of the composition, e.g. fluoropolymer and additives. The concentration of the additives were generally 20× the concentration in the extrusion composition as set forth in Table 3, so the ratio of natural resin to concentrate was 19/1. The specific fluoropolymer resins and additives for foamable extrusion used in the examples are identified in Table 1, and the concentrations by weight based on the total weight of the composition are set forth in Table 3. Unless otherwise stated, polymer resin available from Ausimont USA, Inc. under the trademark HYFLON MFA 840 with a melt flow rate of about 18.3, was employed to let down (dilute) the concentrate to a foamable extrusion composition.

In the following examples the foaming process was a continuous gas injection foaming process carried out using nitrogen as the blowing agent. High pressure gas injection was used with a single injection port. A Siebe 45-mm extrusion wire line available from SIEBE Engineering, Industriegebiet Fernthal, Neustadt/Wied, GERMANY was used in a melt draw extrusion technique. An extruder length/diameter ratio of 30/1 was used and the Siebe 45-mm extrusion line was equipped with a screw designed for foaming operations. Extruder screw design allowed for the gas injection and had mixing sections to provide a uniform melt. Unless otherwise specified a UF-O crosshead available from Unitek North America, Cheshire, Conn., USA was used. Details of the extrusion conditions for the examples are provided in Tables 2 and 3.

Foam extrudate was characterized as follows. Capacitance and diameter of the foamed wire insulation were measured and recorded using the in-line monitoring devices equipped on the Siebe extrusion line. Void fraction was determined by calculating the density of a 12-inch length ("l") of insulation. The void fraction of the insulation was determined by the following method. First the conductor was removed from the primary. The average diameter of the conductor ("$d_1$") and the average diameter of the insulation ("$d_2$") was then determined by taking 5 readings with a USYS10 bench type micrometer with a rotating sample holder (USYS 10H-04A-A DIA FHR-1 Bench Station) available from Zumbach Electronics Corp., Mount Kisco, N.Y., USA. The insulation was then weighed ("w"). The void fraction was determined using the following formula:

$$\text{Void Fraction} = 1 - \frac{w}{[\rho l \pi / 4][d_2^2 - d_1^2]}$$

where $\rho$ is the density of solid polymer and w, l, $d_1$, and $d_2$ are defined above.

Average foam cell size was determined by taking a photograph of a thin cross-section at approximately 50X magnification. The average cell size reported was calculated by averaging the largest 15 cells. The results of the examples are summarized in Table 3.

TABLE 1

Fluoropolymer Resins and Nucleating Agents

| Code | Identification or Description |
|---|---|
| MFA 6012 | HYFLON MFA 6012 from Ausimont |
| MFA 840 | HYFLON MFA 840 from Ausimont |
| NaTB | Sodium tetraborate |
| CaTB | Calcium tetraborate |
| $TiO_2$ | Titanium Dioxide, TI-PURE Grade R900 from DuPont |
| XPH-561 | Barium salt of a mixture of perfluoroalkyl ethane sulfonic acids |
| BN | Boron nitride, Grade CTF-5 from Carborundum Corp. |

TABLE 2

Extruder Details and Extrusion Conditions

| Extruder Conditions | Conditions I |
|---|---|
| Die Diameter (in) | 0.185 |
| Tip Diameter (in) | 0.095 |
| Screw Speed (rpm) | 22–23 |
| Melt Cone length (in) | 1 |
| Air Gap to water quench (m) | 10 |
| Temperatures (° F.) | |
| Zone 1 | 700 |
| Zone 2 | 735 |
| Zone 3 | 785 |
| Zone 4 | 820 |

TABLE 2-continued

Extruder Details and Extrusion Conditions

| Extruder Conditions | Conditions I |
|---|---|
| Clamp | 740 |
| Adapter | 740 |
| Cross-head | 770 |
| Face-Plate | 780 |
| Wire Preheat | 350 |

Example 1

250 ppm $TiO_2$ was combined with 100 ppm NaTB to form the nucleating agent system. The results from Example 1 are set forth in Table 3 under Example 1. Surprisingly, the addition of NaTB allows $TiO_2$ to be an efficient nucleating agent at very low concentrations.

Example 2

To increase the void content of the foamed polymer, the gas pressure was increased from 2,500 psig as used in Example 1 to 3,000 psig. 250 ppm $TiO_2$ was combined with 100 ppm NaTB to form the nucleating agent system, and the results are set forth in Table 3. For comparison purposes, 250 ppm BN and 100 ppm NaTB were tested, and the results of this comparative test are set forth in Table 3 as Example 2C. The results show that the $TiO_2$ based nucleating agent system is more efficient and has a foam cell size 27% smaller than the corresponding BN based nucleating agent system (Example 2C), in which the same materials were used with the $TiO_2$ replaced with BN.

Example 3

250 ppm $TiO_2$, 100 ppm NaTB, and 250 ppm XPH-561, a barium salt of sulfonic acid, were combined to form the nucleating agent system and the results are set forth in Table 3 under Example 3. For comparison purposes, a combination of 100 ppm NaTB and 250 ppm the XPH-561 barium salt of sulfonic acid, without $TiO_2$, were used as the components of a nucleating agent system with the same polymer under the same conditions to determine the effect of the addition of the $TiO_2$ to the system. The results for the comparative test are set forth in Table 3 as Example 3C. Comparison of the results of Example 3 to Example 3C demonstrate that using concentrations of $TiO_2$ at the low concentration of 250 ppm with the inorganic salt and sulfonic acid salt produces a foam cell size 24% smaller. Thus, the combination of $TiO_2$, inorganic salt and sulfonic acid salt act synergistically to provide more efficient nucleation.

Example 4

2,500 ppm $TiO_2$ were combined with 100 ppm NaTB for the nucleating agent system. As reflected in Table 3 under Example 4, this amount of $TiO_2$ proved to be too efficient and, thus, produced cells that were elongated. Elongated cells are undesirable, particularly in thin walled applications, because such cells can cause the foamed insulation to have a low crush force. A good crush force is required since the individual wires are twisted together (twinning). If the crush force is too low the foamed insulation can get damaged which will produce a poor final cable. Accordingly, $TiO_2$ concentrations when combined with inorganic salt should be less than about 2,500 ppm.

Example 5

2,500 ppm $TiO_2$, 100 ppm NaTB, and 250 ppm the XPH-561 barium salt of sulfonic acid were combined and the results are set forth in Table 3 under Example 5. Nucleating agent systems comprising 2,500 ppm $TiO_2$ are too efficient at this high loading of $TiO_2$, as undesirable elongated cells result. Accordingly, $TiO_2$ concentrations, even when combined with inorganic salt and sulfonic acid salts, must be less than about 2,500 ppm for effective nucleation.

Example 6

250 ppm $TiO_2$ was used alone as the nucleating agent (i.e. no inorganic salts or sulfonic acid salts were used). The results are set forth in Table 3 under Example 6. $TiO_2$, alone at the low concentration of 250 ppm does not effectively foam the polymer as only 2.6% voids were obtained. Thus, in order for $TiO_2$ to work at the low concentration range of the invention, the inorganic salts and, optionally, sulfonic acid salts are necessary and these salts act synergistically with the $TiO_2$ for effective cell nucleation to obtain foamed polymers with smaller cell size compared to systems comprising BN.

TABLE 3

| | Process Variables | | | Nucleating Agents | | | | Final Properties | | | |
|---|---|---|---|---|---|---|---|---|---|---|---|
| Example | $N_2$ (psi) | Line Speed (ft/min) | Conductor (inches) | BN (ppm) | $TiO_2$ (ppm) | NaTB (ppm) | XPH-561 (ppm) | Cell Size (micron) | Void (%) | Diameter (inches) | Comments |
| 1 | 2500 | 700 | 0.0223 | — | 250 | 100 | — | 67.2 | 24.5 | 0.04057 | |
| 2 | 3000 | 800 | 0.0223 | — | 250 | 100 | — | 63.4 | 31.3 | 0.03982 | |
| 2C | 3000 | 700 | 0.0215 | 250 | — | 100 | — | 80.8 | 32.1 | 0.04134 | |
| 3 | 3000 | 700 | 0.0215 | — | 250 | 100 | 250 | 55.3 | 26.5 | 0.04036 | |
| 3C | 3000 | 700 | 0.0215 | — | — | 100 | 250 | 73.3 | 33.5 | 0.04157 | |
| 4 | 2500 | 700 | 0.0215 | — | 2500 | 100 | — | 68.1 | 26.2 | 0.04045 | Elongated Cells |
| 5 | 2500 | 700 | 0.0215 | — | 2500 | 100 | 250 | 78.0 | 25.9 | 0.04027 | Elongated Cells |
| 6 | 2500 | 700 | 0.0215 | — | 250 | — | — | NA | 2.6 | 0.03690 | No cell structure |

What is claimed is:

1. A foamable polymer comprising organic polymeric compounds and a nucleating agent system having about 50 ppm to about 2,000 ppm titanium dioxide by weight based on the total weight of the composition, about 25 ppm to about 3,000 ppm inorganic salt selected from the group selected from the group consisting of lithium carbonate, calcium carbonate, calcium tetraborate, strontium carbonate, sodium carbonate sodium tetraborate, sodium sulfite, potassium tetraborate potassium pyrosulfate, potassium sulfate, barium nitrate, aluminum phosphate, sodium fluorosilicate and combinations thereof by weight based on the total weight of the composition, and about 100 to about 3,000 ppm sulfonic acid salts, phosphonic acid salts or combinations thereof by weight based on the total weight of the composition.

2. A foamable polymer comprising fluoropolymer having at least about 35 weight percent fluorine and a nucleating agent system having about 50 ppm to about 2,000 ppm titanium dioxide, by weight based on the total weight of the composition, about 25 ppm to about 3,000 ppm inorganic salt selected from the group selected from the group consisting of lithium carbonate, calcium carbonate, calcium tetraborate, strontium carbonate, sodium carbonate sodium tetraborate, sodium sulfite, potassium tetraborate potassium pyrosulfate, potassium sulfate, barium nitrate, aluminum phosphate, sodium fluorosilicate and combinations thereof, by weight based on the total weight of the composition, and about 100 to about 3,000 ppm sulfonic acid salts, phosphonic acid salts or combinations thereof, by weight based on the total weight of the composition.

3. The foamable polymer of claim 2 wherein the fluoropolymer has a melt flow rate of about 1 g/10 min. to about 100 g/10 min.

4. The foamable polymer of claim 2 wherein the fluoropolymer is a homopolymer of chlorotrifluoroethylene, 2,2-difluoroethylene, or vinylidene fluoride.

5. The foamable polymer of claim 2 wherein the fluoropolymer is a copolymer of tetrafluoroethylene and a monomer selected from the group consisting of chlorotrifluoroethylene, 2,2-difluoroethylene and vinylidene fluoride.

6. The foamable polymer of claim 2 wherein the fluoropolymer is a copolymer of at least one monomer selected from the group consisting of tetrafluoroethylene, chlorotrifluoroethylene, 2–2-difluoroethylene, vinylidene fluoride and combinations thereof and one or more monomers selected from the group consisting of hexafluoropropylene, ethylene, terminally unsaturated perfluoroolefins having 3–8 carbon atoms, perfluoro (alkyl vinyl ether) having 3–8 carbon atoms, perfluoro(alkoxy alkyl vinyl ether) having 5–12 carbon atoms, perfluoroalkyl ethylene having 3–8 carbon atoms, monomers of the dioxle family and combinations thereof.

7. The foamable polymer of claim 2 wherein the fluoropolymer is selected from the group consisting of copolymers of tetrafluoroethylene and perfluoro (methyl vinyl ether), copolymers of tetrafluoroethylene, perfluoro (methyl vinyl ether) and perfluoro (propyl vinyl ether), copolymers of tetrafluoroethylene and perfluro (propyl vinyl ether), copolymers of tetrafluoroethylene and perfluoro (ethyl vinyl ether), ethylene/chlorotrifluoroethylene, copolymers of ethylene/chlorotrifluoroethylene and butyl acrylate, copolymers of ethylene/chlorotrifluoroethylene and hexafluoroisobutylene, copolymers of ethylene/chlorotrifluoroethylene, butyl acrylate and hexafluoroisobutylene and copolymers of tetrafluoro ethylene and hexafluoropropylene optionally containing one or more additional monomers.

8. The foamable polymer of claim 2 wherein the nucleating system has about 100 ppm to about 3,000 ppm sulfonic acid salts, phosphonic acid salts or combinations thereof, by weight based on the total weight of the composition.

9. A foamable composition concentrate comprising fluoropolymer having at least about 35 weight percent fluorine, and a nucleating agent system comprising about 500 ppm to about 40,000 ppm titanium dioxide by weight based on the total weight of the concentrate, about 250 ppm to about 60,000 ppm inorganic salt selected from the group selected from the group consisting of lithium carbonate, calcium carbonate, calcium tetraborate, strontium carbonate, sodium carbonate sodium tetraborate, sodium sulfite, potassium tetraborate potassium pyrosulfate, potassium sulfate, barium nitrate, aluminum phosphate, sodium fluorosilicate and combinations thereof by weight based on the total weight of the concentrate, and about 100 to about 60,000 ppm sulfonic acid salts, phosphonic acid salts or combinations thereof by weight based on the total weight of the concentrate.

10. The foamable composition concentrate of claim 9 wherein the nucleating agent system has about 1,000 ppm to about 60,000 ppm sulfonic acid salts, phosphonic acid salts or combinations thereof by weight based on the total weight of the concentrate.

11. The foamable composition concentrate of claim 9 wherein the fluoropolymer is a homopolymer of chlorotrifluoroethylene, 2,2-difluoroethylene, or vinylidene fluoride.

12. The foamable composition concentrate of claim 9 wherein the fluoropolymer is a copolymer of tetrafluoroethylene and a monomer selected from the group consisting of chlorotrifluoroethylene, 2,2-difluoroethylene and vinylidene fluoride.

13. The foamable composition concentrate of claim 9 wherein the fluoropolymer is a copolymer of at least one monomer selected from the group consisting of tetrafluoroethylene, chlorotrifluoroethylene, 2-2-difluoroethylene, vinylidene fluoride and combinations thereof and one or more monomers selected from the group consisting of hexafluoropropylene, ethylene, terminally unsaturated perfluoroolefins having 3–8 carbon atoms, perfluoro (alkyl vinyl ether) having 3–8 carbon atoms, perfluoro(alkoxy alkyl vinyl ether) having 5–12 carbon atoms, perfluoroalkyl ethylene having 3–8 carbon atoms, monomers of the dioxle family and combinations thereof.

14. The foamable composition concentrate of claim 9 wherein the fluoropolymer is selected from the group consisting of copolymers of tetrafluoroethylene and perfluoro (methyl vinyl ether), copolymers of tetrafluoroethylene, perfluoro (methyl vinyl ether) and perfluoro (propyl vinyl ether), copolymers of tetrafluoroethylene and perfluro (propyl vinyl ether), copolymers of tetrafluoroethylene and perfluro (ethyl vinyl ether), ethylene/chlorotrifluoroethylene, copolymers of ethylene/chlorotrifluoroethylene and butyl acrylate, copolymers of ethylene/chlorotrifluoroethylene and hexafluoroisobutylene, copolymers of ethylene/chlorotrifluoroethylene, butyl acrylate and hexafluoroisobutylene and copolymers of tetrafluoro ethylene and hexafluoropropylene optionally containing one or more additional monomers.

* * * * *

UNITED STATES PATENT AND TRADEMARK OFFICE
CERTIFICATE OF CORRECTION

PATENT NO.    : 6,395,795 B1
DATED         : May 28, 2002
INVENTOR(S)   : Hrivnak It is certified that error appears in the above-identified patent and that said Letters Patent is hereby corrected as shown below:

Column 13,
Lines 42-43, after the first occurrence of the word "group" please delete "selected from the group".
Line 58, after the first occurrence of the word "group" please delete "selected from the group".

Column 14,
Line 64, after the first occurrence of the word "group" please delete "selected from the group".

Signed and Sealed this

Twenty-fourth Day of September, 2002

Attest:

JAMES E. ROGAN
Attesting Officer        Director of the United States Patent and Trademark Office